March 7, 1933.  H. E. BRICE  1,900,791
AUTOMATIC BRAKE ADJUSTER
Filed July 25, 1931    2 Sheets-Sheet 1
Fig-1-
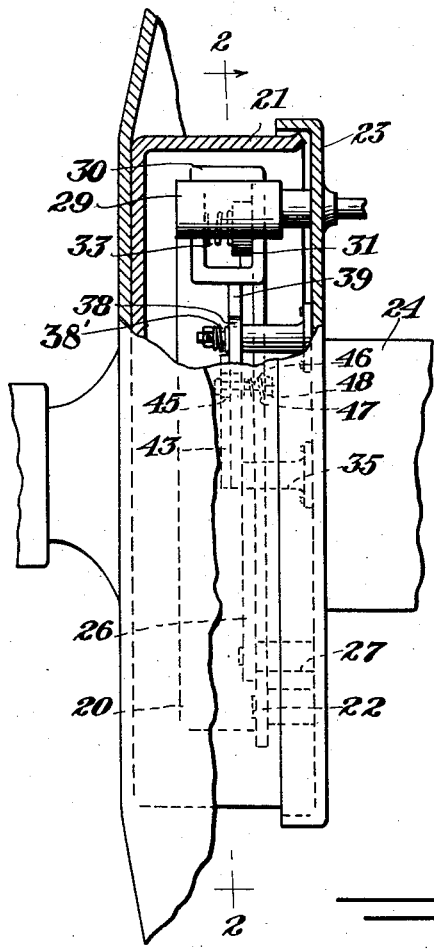
Fig-2-
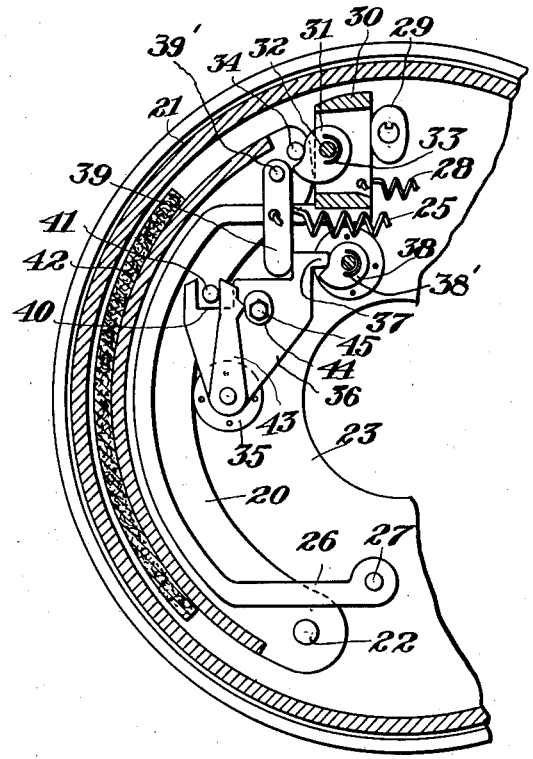
Fig-3-
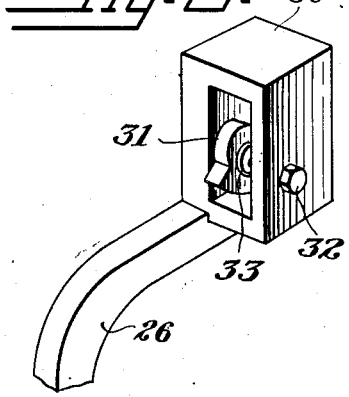
Fig-5-
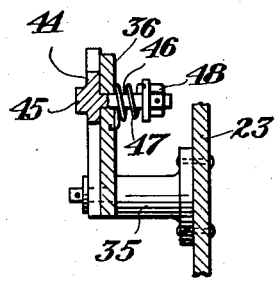
Fig-4-
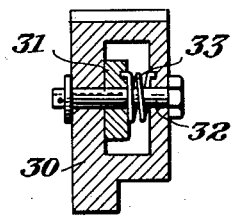
Henry E. Brice
INVENTOR
BY *Victor J. Evans*
ATTORNEY
WITNESS:

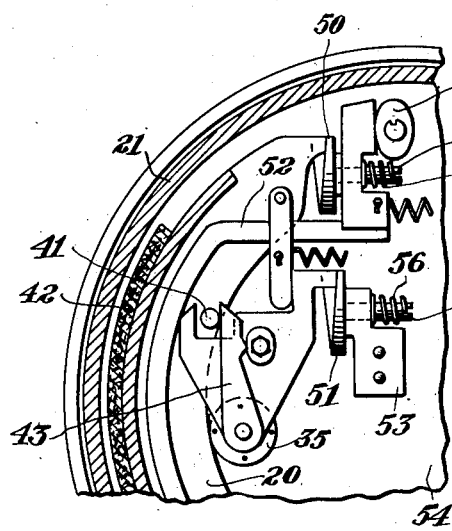

Patented Mar. 7, 1933

1,900,791

UNITED STATES PATENT OFFICE

HENRY E. BRICE, OF NEW YORK, N. Y.

AUTOMATIC BRAKE ADJUSTER

Application filed July 25, 1931. Serial No. 553,166.

The object of the invention is to provide a braking mechanism particularly of the kind adapted for use on auto vehicles, so that the shoe or other braking member may always be moved the same distance despite wear of the brake lining; to provide a brake adjusting means in which the wear take-up is accomplished in infinitesimal increments; to provide a mechanism of this sort in which the foot or hand operating means moves through the same distance in setting the brake after wear as it did previous to any wear having taken place; and to provide a brake adjusting mechanism which is of comparatively simple form and susceptible of incorporation in the conventional brake mechanism of vehicles without material modification thereof.

With this object in view, the invention consists in a construction and combination of parts, of which a preferred embodiment is illustrated in the accompanying drawings, in which:

Fig. 1 is a view in elevation, partly broken away, illustrating the back plate, brake drum and adjacent parts of the wheel and axle housing.

Fig. 2 is a sectional view on the plane indicated by the line 2—2 of Fig. 1.

Fig. 3 is a detail perspective view showing the upper end of the service lever illustrated in the form shown in Fig. 1.

Fig. 4 is a detail sectional view of the cam box of the service lever.

Fig. 5 is a detail sectional view of the rocker block and associated initial adjustment cam.

Fig. 6 is a view similar to Fig. 5 and illustrating a modified form of the invention.

Fig. 7 is a perspective view of the take-up cam employed in the construction shown in Fig. 6.

Fig. 8 is a view similar to Fig. 2, but showing still another modification.

Fig. 9 is a perspective view of the wear take-up member of the construction illustrated in Fig. 8; and Fig. 10 is a view similar to Fig. 2, but showing still another modification.

Figs. 11 and 12 are views similar to Fig. 2, but showing still further modifications.

The invention comprises an automatic take-up means actuatable in infinitesimal increments to provide for the same degree of swinging movement to be imparted to the shoe 20, when forced into engagement with the brake drum 21, the drum being carried by the wheel as usual and the shoe being pivotally mounted, as indicated at 22, on the back plate 23, which is carried by and may be formed as an integral part of the axle housing 24. Spring retracted, as indicated at 25, the shoe is moved into engagement with the drum by pressure applied at the free end of a service lever 26, rocking mounted on the back plate as indicated at 27. The service lever is also spring retracted, as indicated at 28, and pressure is applied to its free end through the medium of a cam 29, rockingly mounted on the back plate and adapted to be rotated through any of the conventional instrumentalities that will permit of hand or foot actuations.

The free end of the service lever is formed with a box 30, which on the rear edge is engaged directly by the cam 29, and this box houses a cam 31 keyed to a stud 32 journalled in the box. A spring 33 surrounds the stud and is anchored one end in a wall of the box and the other in the cam 31, so that there is a tendency to rotate the cam to progressively present the successive points of rise on the latter to the pin 34, which is mounted on the shoe adjacent the free end. The spring 33 is a torsional spring and rotation of the cam thereby is precluded except when there is any slight separation of the pin and cam, when the latter may be rotated toward the high point to close the separation space between the two. In moving the shoe to service position, pressure is applied to it from the service lever directly through the cam 31.

Rockingly mounted on the back plate 23, on a post 35 carried by the latter, is a rocker block 36, this having a nose 37 bearing against the edge of a cam 38, similar to the cam 31 and similarly actuated by a torsional spring 38', this cam 38, however, being rotatably mounted on the back plate. The nose 37 of the rocker is held firmly against the cam by the free end of a lever 39, which is pivotally mounted, as at 39', on the shoe 20. The spring 25 is anchored at a midpoint in the lever 39 and thus serves to hold the pin 41 against the stop 43 by reason of the pull applied on pivot pin 39' and likewise to hold the nose 37 in engagement with the cam 38.

The block 36 is formed with a slot 40 in which is disposed a pin 41 carried by the brake shoe. The brake shoe in moving to service position will rock the block slightly by reason of the pin engaging the forward edge of the slot if there has been any wear on the brake lining 42. This will result in the nose 37 being withdrawn from the engaged point on the cam 38, when the spring of the latter will immediately rotate the cam to take up the space. Thus the forward edge of the slot 40 is engaged by the pin 41 and the rocker block is moved whenever wear occurs.

The retracted position of the brake shoe is determined by the stop 43 which is mounted in common with the pivot of the block on the post 35. This stop 43 extends above the bottom edge of the slot and is engaged by the pin 41 in the retracted position of the shoe and the spacing between the shoe lining and the drum is determined by the manual setting of the stop 43, which is accomplished by rotating the cam 44 with a wrench applied to the wrench seat 45. The cam 44 is provided with a shank 46 extending through the block 36 and carrying a friction spring 47 compressed between the block and a removable fastener 48 mounted on the shank. The friction spring is sufficient to retain the adjusting cam 44 in its set position.

In the retracted position of the shoe 20, the pin bears against the stop 43 which determines the spacing between the lining and the drum. The nose of the block is held against the cam 38 by the lever 39, the spring holding the free end of this lever against the shoulder on the block and retracting the shoe by reason of the connection of the lever with the shoe. Since the cam 29 acts as the stop for the service lever 26, the spring 25 keeps the pin 34 in contact with the cam 31. In shifting to service position, rotation of the shaft of the cam 29 forces the free end of the service lever 26 forwardly, and thereby, by reason of the engagement of the cam 31 with the pin 34, moves the shoe lining into frictional engagement with the drum, at which time the pin 41 will be almost engaged for the forward edge of the slot 40. After repeated operations shall have resulted in wear of the brake lining, the pin 41 will engage the forward edge of the slot 40, when the block 36 will be rocked slightly, when the cam 38 will move to a new position to prevent the block rocking back to its forward position and this new position will be determined by the amount of wear which has taken place in the brake lining. When the brake is released, the shoe will move back, when its return position will be determined by the then location of the stop 43. But the service lever may move back as far as formerly, so that there will then be a slight separation between the pin 34 and the originally engaged point on the cam 31, which will be closed by the rotation of the cam.

In the modification illustrated in Fig. 6, the automatic take-up means are in the form of face cams 50 and 51, of which the former is mounted in the free end of the service lever 52, and the latter in a block 53 carried on the back plate 54. Both cams are formed with cross-sectionally circular shanks 55 rotatably mounted in the parts by which they are carried and the shanks are surrounded with springs 56 of the torsional type adapted to rotate the shanks and thus rotate the cams to make up for the wear above indicated.

In the modification illustrated in Fig. 8, the service lever 60 is much shorter than in the other forms, being pivoted to the back plate as indicated at 61. The shoe 62 has its take-up means consisting of an abutment member 63 formed with a threaded shank 64 loosely engaging a threaded hole in the shoe 62. The abutment member 63 engages the service lever 60 and when any separation between the two takes place as a result of wear, the abutment member is advanced by reason of it being rotated through the medium of the spring 66, which has anchored one end to the shank of the abutment member with the other end engaged with the shoe by reason of the terminal 66' (Fig. 9) bearing against the side of the shoe. A similar abutment member 67 mounted in a block 68 on the back plate is similarly actuated and functions in a like manner to make up for any change in position of the rocker block 69.

In the modification illustrated in Fig. 10, the lever 39 is omitted and the rocker block 70, instead of being mounted on the back plate is inverted and pivotally mounted on the shoe 71, as indicated at 72, in common with the stop 73. The retracting spring 74 for the shoe is connected directly with the block 70.

Each time the brake is applied, the shoe 71 and pivot pin 72 move to the left but the lower end of the rocker block 70 is held against the adjusting cam by the pull of the spring 74. Thus block 70 rocks on its pivot 72. When lining wear causes the pin 41 to press against the left edge of the slot of block 70, rocking of the block ceases and it moves bodily with the shoe away from the cam. The cam is then turned by its spring 96' until it closes the intervening space. When the brake is released, the spring 74 again pulls the shoe to the right, block 70 rocks on its pivot pin 72 in the opposite direction, and pin 41 again rests against stop 73. Owing to the new position of the cam, however, the stop is in a new position to the left of its former position.

The modification illustrated in Fig. 11 shows a conventional toggle 80 as the actuating means for the service lever 81, this being operable by pressure applied to the joint 82 through a clearance opening 83 in the back plate. In the use of such actuating means, a fixed stop 83', mounted on the back plate 84 serves to determine the retracted position of the service lever.

In the modification shown in Fig. 12, fluid means are shown as the actuating element and in the illustrated embodiment of this modification, the cylinder 90 which houses an elastic bag 91 adapted to receive either an elastic or inelastic fluid, is open ended and houses the pistons 92 against which the walls of the bag lie. The piston is directly connected to the shoe 93 and on the admission of fluid under pressure to the bag, is forced into operative position by the piston. In the use of the fluid pressure operating means, no service lever is necessary and the automatic adjustment of the shoe is taken care of by the rock block 94 and its attendant cam 95, of the same design and functioning in the same way as the corresponding parts in the other illustrated forms of the invention.

While the illustrations show but the one shoe, it is obvious that two are employed in a brake mechanism constructed in accordance with the invention and the retractile springs for both the service levers and shoes may be anchored at their opposite ends to the corresponding companion parts, rather than have one end anchored to the back plate as above stated. In the construction shown in Fig. 12, the second piston 92 is directly connected to the diametrically opposite companion shoe.

What I claim as new is:

1. An automatic brake adjusting means comprising a pair of relatively movable friction members of which one is mounted to be forced into engagement with the other, actuating means engageable with said first member, a stop engageable with an element of said first member to limit the separation of the members, automatic take-up means interposed between the first member and the actuating means, and a second automatic take-up for advancing said stop in accordance with the wear occurring between said members, said automatic take-up means comprising spring actuated cams precluded from change by the first said member and the stop respectively, except as wear takes place between said members.

2. An automatic brake adjusting means comprising a pair of relatively movable friction members of which one is mounted to be forced into engagement with the other, a service lever mounted adjacent to the first said member and adapted to be forced toward the latter to engage both of said members, a spring actuated cam carried by said service lever and engageable with an element of the first said member, a rockable member formed with a clearance slot in which an element of the first said member is disposed, said rockable member having an adjustable stop to be engaged by the element of the first said member on retraction of the latter, and a spring-actuated take-up cam against which said rockable member abuts.

3. An automatic brake adjusting means comprising a pair of relatively movable friction members of which one is pivotally mounted to be forced into engagement with the other, a service lever also pivotally mounted and having its free end disposed adjacent the free end of the first said member, an automatically adjustable abutment carried by the free end of the service lever and engaging an element of the first said member, a rocker formed with a clearance slot in which is disposed an element of the first said member, and an automatically adjustable abutment for said rocker.

4. An automatic brake adjusting means comprising a pair of relatively movable friction members of which one is pivotally mounted to be forced into engagement with the other, a service lever also pivotally mounted and having its free end disposed adjacent the free end of the first said member, an automatically adjustable abutment carried by the free end of the service lever and engaging an element of the first said member, a rocker formed with a clearance slot in which is disposed an element of the first said member, and an automatically adjustable abutment for said rocker, the rocker incorporating a manually adjustable stop with which that element of the first said member disposed in the slot engages in the retracted position of said member.

5. Mechanism for the purpose indicated comprising a drum, a pivotally mounted brake shoe for movement into engagement with and retraction from said drum, a service lever pivotally mounted with its free terminal adjacent the free terminal of the shoe, a spring actuated cam carried by the free end of the service lever and engaging an element of the shoe, a rocker formed with a clearance slot for an element of the shoe and engaging opposite sides of the slot in the opposite positions of the shoe, and a spring actuated cam engaging a nose of said rocker, 6. Mechanism for the purpose indicated comprising a drum, a pivotally mounted brake shoe for movement into engagement with and retraction from said drum, a service lever pivotally mounted with its free terminal adjacent the free terminal of the shoe, a spring actuated cam carried by the free end of the service lever and engaging an element of the shoe, a rocker formed with a clearance slot for an element of the shoe and engaging opposite sides of the same in the opposite positions of the shoe, and a spring actuated cam engaging a nose of said rocker, the rocker incorporating an adjustable stop constituting one of the abutment walls of said slot.

7. In combination with a pair of relatively movable friction members with co-acting friction faces adapted to be pressed together for braking purposes and supplied both with means for pressing them together and means for separating them, automatic adjusting means for controlling the extent of this separation, said automatic means containing a rotatable cam, spring means for rotating this cam, restraining means restraining the spring means from rotating the cam except in consequence of wear of the friction faces, means whereby wear of these faces will result in releasing these restraining means so the spring means will then rotate the cam, and means whereby the rotation of this cam will compensate for wear of the friction faces by adjusting the inoperative position of one of the friction members, so the friction faces will have approximately the same amount of relative movement allowed to them either in their relative approachment or separation after wear has occurred between them as before.

8. In automatic brake adjusters in which one thing desired is to limit the re-approachment of two separable parts when once they separate, a variable spacer comprising a helical-shaped member rotatable around its own axis and holding a resisting portion against each separable part, spring means constantly urging the helical member to rotate but normally prevented from rotating it by pressure exerted by the separable parts against the resisting portions, and means whereby the rotation of the helical member in the direction of that urge will result in wider-spaced resisting portions, so that when the separation of the separable parts causes these parts to cease pressing against the resisting portions, the helical member rotates in response to its spring urge and limits the re-approachment of the separable parts to normal clearance distance.

9. In an assembly of wheel parts where braking power is required, and containing a non-rotative supporting structure, a rotative friction member, and a non-rotative friction member anchored to the supporting structure but capable of being moved toward the rotative friction member for braking purposes; a pair of co-acting friction faces between the two friction members, means for pressing these faces together, means for separating them, a stop anchored to the supporting structure, a variable spacer associated with this stop, an intermediate adjusting member connecting the non-rotative friction member with the variable spacer, spring means pressing the intermediate member against the variable spacer, means connecting the non-rotative friction member with the intermediate member so the separation of the friction faces will be limited by these means, by the intermediate member, and by the spacer and the stop, said means allowing a limited amount of relative re-approachment of the friction members without moving the intermediate member but moving that member away from the spacer when that limit is exceeded, and spring means operating the spacer when this last-named movement occurs so as to prevent the intermediate member from returning to its former position, the exceeding of the mentioned limit resulting from wear of the friction faces and the prevention of the intermediate member's return being for the purpose of compensating for that wear.

10. In an assembly of wheel parts where braking power is required, and containing a non-rotative supporting structure, a rotative friction member, and a non-rotative friction member anchored to the supporting structure but capable of being moved toward the rotative friction member for braking purposes, a pair of co-acting friction faces between the two friction members, means for pressing these faces together, spring means for separating them, a stop anchored to the supporting structure, an intermediate adjusting member, a variable spacer capable of varying the distance between the intermediate member and the stop, means connecting the previously mentioned spring means to the non-rotative friction member and also to the intermediate member so as to urge the friction faces apart and at the same time press the intermediate member against the variable spacer, means connecting the non-rotative friction member with the intermediate member so as to limit the separation of the friction faces, said means allowing a limited amount of approachment of the friction members without moving the intermediate member but moving that member from the spacer when that limit is exceeded, an axis on which the variable spacer may turn, spring means for turning this spacer when the intermediate member moves away from it, and means whereby this turning will prevent the intermediate member from returning to its former position.

11. A rotative friction member, a non-rotative friction member, co-acting friction faces between these members adapted to be pressed together for braking purposes, means for pressing them together, means for separating them, and automatic means for controlling the extent of this separation, said automatic means including an intermediate movable adjusting member co-acting with the non-rotative friction member so that these members taken together constitute a pair of adjustment-controlling members, two stops on one of these last-named members, two rigid obstructions controlled by the other member for engagement with these stops, these stops being so spaced that the non-rotative member is allowed a limited amount of free movement before engagement of the stops causes it to either press or move the intermediate member, and manual adjusting means for controlling the extent of this free movement so as to manually control the amount of relative approachment or separation which the friction faces may have before the adjustment controlling members actuate the automatic means.

In testimony whereof I hereby affix my signature.

HENRY E. BRICE.